UNITED STATES PATENT OFFICE.

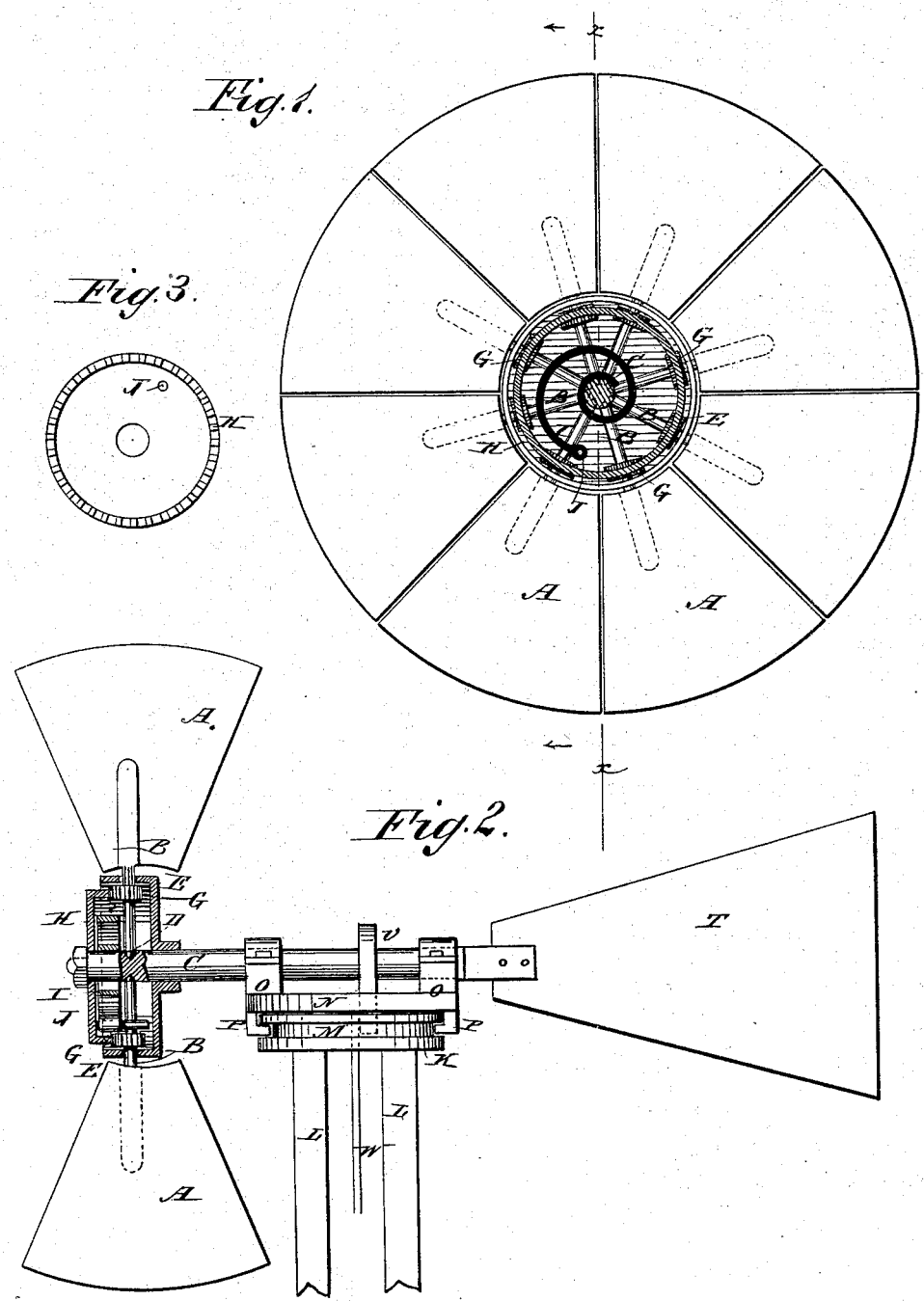

EDWARD STICKLER, OF NEOSHO FALLS, KANSAS.

WINDMILL.

SPECIFICATION forming part of Letters Patent No. 263,618, dated August 29, 1882.

Application filed May 8, 1882. (No model.)

*To all whom it may concern:*

Be it known that I, EDWARD STICKLER, of Neosho Falls, in the county of Woodson and State of Kansas, have invented a new and Improved Windmill, of which the following is a full, clear, and exact description.

This invention consists of the contrivance of a spring or springs with the vanes of a windmill for holding the vanes in position for the wind to act upon them, the arrangement being such that the area of the vanes subject to the wind-pressure will vary according as the wind varies in force, so that power and motion of the wheel will be uniform, although the force of the wind may vary, the power being more or less, according as the power of the spring is greater or less, and the contrivance is such that the tension of the spring may be varied.

Reference is to be had to the accompanying drawings, forming part of this specification, in which similar letters of reference indicate corresponding parts in all the figures.

Figure 1 is partly a front elevation and partly a transverse section of my improved wind-wheel. Fig. 2 is a sectional elevation of Fig. 1 on line $x\ x$, looking in the direction of the arrows; and Fig. 3 is a front elevation of a gear-wheel employed to connect the vanes of the wheel with the spring.

A represents the vanes of the wind-wheel, which are mounted on arms B, stepped in the shaft C at D, and supported in the rim E of the wheel, so that said vanes may turn on said arms for being shifted from the plane of Fig. 1 to the requisite oblique positions for the action of the wind to produce rotation of the wheel and for return to said plane.

To each arm B there is fitted a pinion, G, just inside of rim E, gearing with a wheel, H, turning loosely on shaft C and attached to one end of a coiled spring, I, by pin J, said spring being connected by its other end to the shaft C. The vanes are connected eccentrically to their arms B, so that there is a preponderance of pressure on one side, by which the vanes are turned by the wind obliquely to it for producing rotation of the wheel. The spring resists the turning of the vanes on their arms B in this manner by the wind, and its power governs the power of the wheel by closing the vanes, so as to present large area to the wind in case the wind is light, and allowing them to open and present less area when the wind is strong.

To vary the tension of the spring the wheel H may be shifted back out of gear with the pinions and set around a few teeth, so as to draw the spring harder, the vanes being fixed with stops applied to them or their arms, or to the pinions, so that no matter what the tension of the spring may be, the vanes will not be turned by the spring beyond the plane of Fig. 1.

For the turn-table I propose to employ a strong ring, K, upon the tower L, having a groove M in the face, and having another ring, N, mounted on the upper side of it to carry the bearings O for the driving-shaft, and having guards P running in the groove M to keep ring N in position, and at the same time allow it to revolve freely as the wind-wheel shifts about with the wind by the tail-vane T.

V is an eccentric mounted on the shaft in the center of the rings K and N for transmitting the power by a rod, W; but I may also use bevel-wheels for the purpose.

Having thus fully described my invention, what I claim as new, and desire to secure by Letters Patent, is—

1. In a windmill, the wheel-governor described, consisting of the vanes A, secured to the oscillating arms B, provided with beveled gears G, communicating with the beveled-gear wheel H, to which one end of the volute spring I is attached, the other end of the spring being secured to the main shaft C.

2. The combination of the vanes A, arms B, gear-wheels G H, spring I, shaft C, and wheel E, provided with bearings in its rim for the arms B, as shown.

EDWARD STICKLER.

Witnesses:
 JNO. W. BEARD,
 R. R. WALLACE.